(12) United States Patent
Langer

(10) Patent No.: US 9,774,474 B2
(45) Date of Patent: Sep. 26, 2017

(54) GATEWAY FOR A MOTOR VEHICLE AND MOTOR VEHICLE

(71) Applicant: AUDI AG, Ingolstadt (DE)

(72) Inventor: Niels-Stefan Langer, Dachau (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 15/111,411

(22) PCT Filed: Oct. 25, 2014

(86) PCT No.: PCT/EP2014/002881
§ 371 (c)(1),
(2) Date: Jul. 13, 2016

(87) PCT Pub. No.: WO2015/139714
PCT Pub. Date: Sep. 24, 2015

(65) Prior Publication Data
US 2017/0005835 A1 Jan. 5, 2017

(30) Foreign Application Priority Data

Mar. 20, 2014 (DE) .................. 10 2014 003 949

(51) Int. Cl.
*H04L 12/66* (2006.01)
*H04L 12/40* (2006.01)
(Continued)

(52) U.S. Cl.
CPC ........ *H04L 12/66* (2013.01); *H04L 12/40091* (2013.01); *H04L 67/12* (2013.01);
(Continued)

(58) Field of Classification Search
CPC ............... H04L 12/66; H04L 12/40091; H04L 2012/40241; H04L 2012/40273;
(Continued)

(56) References Cited

U.S. PATENT DOCUMENTS

2003/0080619 A1* 5/2003 Bray ................. H04L 12/40006
307/10.1
2005/0221851 A1 10/2005 Grivas et al.
(Continued)

FOREIGN PATENT DOCUMENTS

DE WO01/42051 A1 * 6/2001 ............ B60R 11/02
DE 101 13 719 A1 9/2002
(Continued)

OTHER PUBLICATIONS

German Office Action dated Aug. 27, 2014 from German Patent Application No. 10 2014 003 949.8, 6 pages.
(Continued)

*Primary Examiner* — Ian N Moore
*Assistant Examiner* — Justin T Van Roie
(74) *Attorney, Agent, or Firm* — Staas & Halsey LLP

(57) ABSTRACT

A connection device for connecting to all bus systems of a motor vehicle is provided for communicating between different vehicle systems and is included in a gateway for the motor vehicle. A computing device designed for controlling the exchange of data between the bus systems is also included in the gateway. The gateway additionally has at least one communication device for wireless Communication in a network having at least one device external to the motor vehicle and the computing device is designed for controlling the data exchange between the several bus systems and the network.

12 Claims, 1 Drawing Sheet

(51) Int. Cl.
*H04L 29/08* (2006.01)
*H04W 84/12* (2009.01)

(52) U.S. Cl.
CPC ............... *H04L 2012/40215* (2013.01); *H04L 2012/40234* (2013.01); *H04L 2012/40241* (2013.01); *H04L 2012/40273* (2013.01); *H04W 84/12* (2013.01)

(58) Field of Classification Search
CPC . H04L 2012/40234; H04L 2012/40215; H04L 67/12; H04W 84/12
See application file for complete search history.

(56) References Cited

U.S. PATENT DOCUMENTS

| | | | |
|---|---|---|---|
| 2005/0251604 A1 | 11/2005 | Gerig | |
| 2007/0124046 A1 | 5/2007 | Ayoub et al. | |
| 2011/0191484 A1* | 8/2011 | Babbar | G06F 9/5011 709/228 |
| 2013/0227648 A1 | 8/2013 | Ricci | |
| 2015/0019897 A1 | 1/2015 | Horihata | |
| 2017/0075835 A1* | 3/2017 | Langer | G06F 15/167 |

FOREIGN PATENT DOCUMENTS

| | | | |
|---|---|---|---|
| DE | 102 34 726 A1 | 2/2003 | |
| DE | 10 2005 012 290 A1 | 9/2006 | |
| DE | 10 2011 005 088 A1 | 9/2011 | |
| DE | 10 2011 007 387 A1 * | 10/2012 | ............. H04L 12/26 |
| DE | 10 2014 003 949.8 | 3/2014 | |
| EP | 1 235 701 B1 | 9/2002 | |
| FR | 2 933 832 | 1/2010 | |
| WO | 2013/121881 A1 | 8/2013 | |
| WO | PCT/EP2014/002881 | 10/2014 | |

OTHER PUBLICATIONS

International Search Report dated May 20, 2015 from PCT/EP2014/002881 including English language translation, 9 pages.

International Preliminary Report on Patentability dated Sep. 22, 2016 from International Patent Application No. PCT/EP2014/002881, 13 pages.

Corrected International Preliminary Report on Patentability (including Forms PCT/IPEA/409, PCT/IPEA/424, and PCT/IPEA/416) dated Nov. 17, 2016, from International Patent Application No. PCT/EP2014/002881, and English translation of the Corrected International Preliminary Report on Patentability (23 pages total).

* cited by examiner

LEGEND

1 GATEWAY
2 HOUSING
3 CONNECTIO DEVICE
4 BUS SYSTEMS
5 COMPUTING DEVICE
6 COMMUNICATION DEVICE
7 NAD
8 ANTENNA
9 NETWORK
10 SPI AND/OR USB LINK

LEGEND

1 GATEWAY
8 ANTENNA
11 MOTOR VEHICLE
12 CRASH-PROOF AREA
13 REAR BENCH
14 CABLE CROSSING
15 CABLE ROUTES

LEGEND

1 GATEWAY
16 CONNECTOR
17 COPPER PLATE
18 CHASSIS PART

GATEWAY FOR A MOTOR VEHICLE AND MOTOR VEHICLE

CROSS REFERENCE TO RELATED APPLICATIONS

This application is a U.S. national stage of International Application No. PCT/EP2014/002881, filed Oct. 25, 2014. The International Application claims the priority benefit of German Application No. 10 2014 003 949.8 filed on Mar. 20, 2014. Both the International Application and German Application are incorporated by reference herein in their entirety.

BACKGROUND

Described herein is a gateway for a motor vehicle, having a connection device for connecting to a number of, particularly all, bus systems of the motor vehicle provided for communicating between different vehicle systems, and a computing device designed for controlling the exchange of data between the bus systems. Also described herein is a motor vehicle which includes the gateway.

In modern motor vehicles, a multiplicity of data needs to be exchanged between different vehicle systems. To enable this exchange to take place, bus systems are used within the motor vehicle, for example CAN buses, LIN buses and/or FlexRay buses. In this context, a multiplicity of buses is provided in most cases since bus systems have a limited bandwidth and characteristics suited better or worse for various purposes, and the quantity of data which can be transmitted via a bus system is restricted, therefore, and some bus systems are better suited for some applications than other bus systems.

Nevertheless, the exchange of data between vehicle systems which are connected to different bus systems is also necessary so that a data exchange between bus systems is also needed. For this purpose, it is known to provide interconnection control devices which are frequently also called a "gateway" and are connected to all bus systems of the motor vehicle between which a data exchange may become necessary. A computing device of the gateway which is connected to all these bus systems by way of a connection device controls the exchange of data between the bus systems, i.e. carries out routing.

Apart from these internal communication options, it is becoming more and more common to link motor vehicles also to external networks, particularly to the Internet. In this way, it is possible not only to implement comfort functions but also to call up current information directly connected with the handling of the motor vehicle, for example with respect to the road condition, weather conditions and the like. In this context, the connection to the Internet is established mostly via a mobile radio network.

In order to implement such an "online link" to an external network, it is known to provide a special control device which can be called, for example, an "online connectivity unit" (OCU). In such a control device, or connected to it, there can also be a communication device which can be implemented, for example, as a telephone module with an antenna and corresponding electronics. Such communication modules are frequently also called a "network access device" (NAD). A link to other vehicle systems on the basis of the control device is implemented via a bus system of the motor vehicle, modern motor vehicles frequently having a number of vehicle buses (bus systems). The control device, therefore, usually has a link to one of these bus systems in order to be able to convey data received from the network to other vehicle systems or to receive from these data directed to the network and forward them to the communication device.

The problem is then that the bus link used for the OCU is limited in its bandwidth and cannot be utilized for broadband data. In addition, the CAN bus of the vehicle is already extensively utilized and all data needed by the OCU or delivered data would have to be provided additionally here. If communication is needed to another vehicle bus than the one to which the OCU is connected, two vehicle buses have to be kept active so that a high zero-signal current is required.

SUMMARY

Described herein is a gateway for improving the data exchange between a motor vehicle and an external network, particularly the Internet.

The gateway has at least one communication device for wireless communication in a network having at least one device external to the motor vehicle and a computing device designed for controlling the data exchange between the several bus systems and the network.

It is thus proposed to integrate an "online connectivity unit", hitherto provided separately, into an interconnection control device, that is to say a gateway. In this way, any data exchange can be controlled at a single location, namely in the gateway. The gateway thus forms a type of central node. Once a link to some or all vehicle buses exists and data can thus be provided from the network directly to the target bus system, broadband linkage is possible. If a special control device (OCU) connected only to a single bus system, for example a CAN bus, were used, the entire traffic would have to run to and from the external network via this one bus system which would be utilized too extensively since the bus systems, as has been described, are limited in their bandwidth.

The gateway has the further advantage that a better zero-signal current characteristic is possible since in the data exchange with the Internet, the target bus can be addressed directly without having to keep further vehicle buses "awake". There is also a monetary saving potential given since certain hardware components are no longer needed.

In this arrangement, the communication device can have a transmitting/receiving device and/or an antenna. The communication device can be a telephone module (mobile radio network module) which is frequently also called a network access device (NAD). This provides for a linkage to a mobile radio network and possibly to the Internet via the mobile radio network. An antenna does not mandatorily have to be provided in the gateway itself, particularly if the latter is arranged at a more shielded location which will still be discussed in greater detail in the text which follows.

As has already been explained, the communication device can be an interface to a mobile radio network, that is to say a telephone module. However, other communication devices are also conceivable so that the communication device (or possibly another communication device integrated into the gateway) can be a WLAN interface. Via WLAN networks, it becomes possible, in particular, to set up a Car2X communication to other motor vehicles and infrastructure facilities in order to also call up information relevant to the motor vehicle itself which can be transferred directly to the correct bus system when the corresponding communication device is installed in the gateway. Thus, the gateway described herein is also extremely advantageous with respect to the WLAN connectivity.

Due to the integration, the communication device and the computing device are suitably arranged in a common housing. This is dimensioned correspondingly in order to be able to accommodate also the communication device, particularly the transmitting/receiving device, in addition to the connection device and the computing device.

Between the communication device and the computing device within the gateway, there is naturally a communication link which can be implemented suitably as a serial peripheral interface link (SPI link) and/or as a universal serial bus link (USB link). Thus, broadband data forwarding from the network or into the network can take place within the gateway without having to accept restrictions which are too great in this respect. In an embodiment, the computing device and the communication device can be designed for communication with one another by using the TCP/IP protocol. This becomes available, in particular, if a link to the Internet or a WLAN network is to be established indirectly or directly via the communication device since TCP/IP is the protocol of choice there, in any case, and lastly changes in format possibly still necessary or the like of the data can take place in the computing device of the gateway.

Also described herein is a motor vehicle the gateway and the bus systems. Naturally, the vehicle systems which are connected by the bus systems are also provided in the motor vehicle. All embodiments with respect to the gateway can be implemented analogously in the motor vehicle to obtain the aforementioned advantages.

An appropriate positioning of the gateway in the motor vehicle deserves particular attention. In this context, it is particularly advantageous if the gateway is arranged in a crash-proof area, particularly a passenger cell, and/or adjacently to a cable routing device carrying cables of several, particularly all bus systems, particularly a cable route or a cable duct. Maintaining the communication between the different vehicle systems, even if those are connected to different vehicle buses (bus systems) is also of extreme importance in an emergency case in order to keep particular vehicle systems operable. Such an emergency case occurs in a collision (crash) of the motor vehicle with another road user and/or an object so that, within the context of the disclosure, it may be desirable that the gateway is arranged in a crash-proof area. Due to the design of modern motor vehicles in which outer areas of the chassis form crumple zones and the like, such a crash-proof area is mostly located in the inner area of the passenger cell so that the gateway can also be arranged there.

Furthermore, it may be appropriate to provide the gateway adjacently to a cable routing device which may carry cables of all bus systems to which the gateway is connected so that no long additional cable lines are required any more. Such a cable routing device can be, for example, a cable route or a cable duct, a particular option being that the gateway is provided in the area of a cable crossing in the motor vehicle so that a most optimal linkage possible is guaranteed. At a cable crossing, cable routing devices lastly cross so that the gateway is arranged at a node, for example the most important node, in the motor vehicle.

A further advantageous embodiment provides that the gateway is connected heat-conductively to a chassis part forming an outer boundary of the motor vehicle. Such a thermal linkage to the vehicle chassis thus provides for heat dissipation, and thus cooling, of the gateway without requiring a separate cooling device for this purpose.

In this context, various embodiments are conceivable, for example, to design the housing itself to be at least partially heat-conducting and to provide a connection to the heat-generating components of the computing device and/or communication device so that a removal of heat via the housing to the chassis part cooled by the driving movement is achieved. To establish the heat-conducting connections, materials of good heat conductance can be used, for example copper and/or aluminum and/or heat-conducting paste.

If the gateway also has an antenna as part of the communication device, it is also appropriate to select the location of installation of the gateway in such a manner that there are no finely meshed metal structures above the control device. This largely prevents relative shielding.

Investigations have shown that it is particularly suitable especially with regard to the considerations made above if the gateway is installed on a center tunnel or below a backseat bench of the motor vehicle. Alternatively, it is also possible to install the gateway below a driver's seat which, however, may be less desirable due to the lesser amount of installation space available there. An installation position on the center tunnel or below the backseat bench fulfills most of the criteria excellently, particularly the vicinity to a cable routing device or even a central node of cablings in the motor vehicle, good linkage to the chassis and in the case of an antenna provided in the control device also low shielding. In addition, there is adequate installation space there.

To arrange an external antenna, there are several possibilities in the motor vehicle. It is frequently provided that the motor vehicle comprises an antenna for the network arranged in the area or within a window of the motor vehicle which can then be connected correspondingly to the communication device of the gateway.

BRIEF DESCRIPTION OF THE DRAWINGS

Further advantages and details of the exemplary embodiments are described in the text which follows and in the drawings, in which.

DETAILED DESCRIPTION OF THE PREFERRED EMBODIMENT

Figure 1:
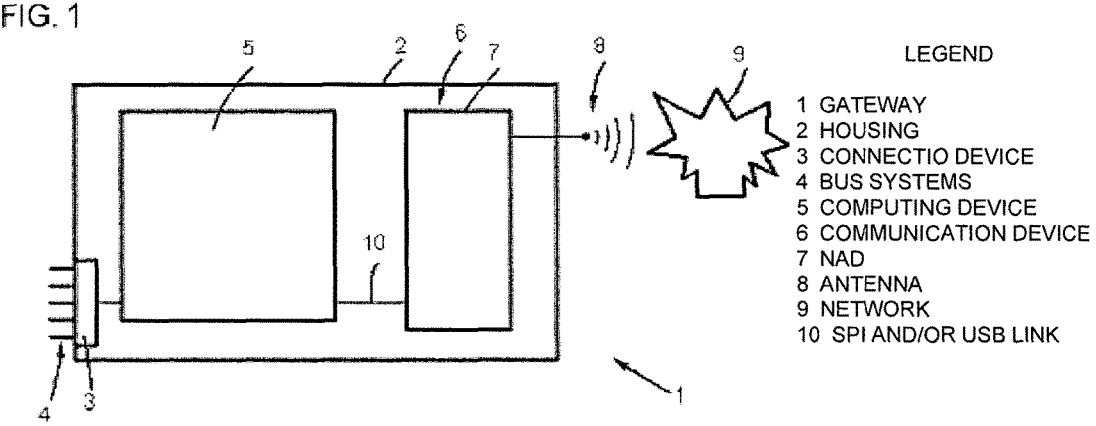
FIG. 1 is a block diagram of a gateway.

Reference will now be made in detail to the preferred embodiments, examples of which are illustrated in the accompanying drawings, wherein like reference numerals refer to like elements throughout.

In the drawings FIG. 1 shows a schematic diagram of a gateway 1 which thus has at the housing 2 a connection device 3 to various bus systems 4 of the motor vehicle in which the gateway 1 is installed. The bus systems 4 in each case connect a number of vehicle systems to one another so that a data exchange becomes possible.

The data exchange between the various bus systems 4, that is to say the routing, is controlled by a computing device 5 which, for example, can be designed as a microprocessor or can have such a one.

In the same gateway 1, concretely in the same housing 2, a communication device 6 may also be provided, for example a telephone module 7 (frequently also called NAD—network access device). In this manner, a connection into an external network 9, in this case the Internet, can be set up via a mobile radio network by using a suitable antenna 8 which can be provided inside or outside the gateway 1. Naturally, a connection into a WLAN network can also be established in the same way via a corresponding communication device 6 designed as WLAN interface.

The computing device 5 and the communication device 6 may be connected via an SPI link 10 (alternatively or additionally to a USB link) via which the data exchange can take place by using TCP/IP as a protocol. The computing device 5 is also designed to control the data exchange between the bus systems 4 and the network 9. This means, in particular, that information from the network 9 can be fed directly into the correct vehicle bus 4 without requiring a further bus system 4 as an intermediate transmission medium; conversely, information for the network 9 can be taken directly from the corresponding bus system 4 and forwarded to the network 9. The gateway 1 thus forms a central node for the communication within the motor vehicle and the communication to the at least one network 9 outside the motor vehicle. Thus, such a gateway 1 can also be called "connected gateway".

Figure 2:
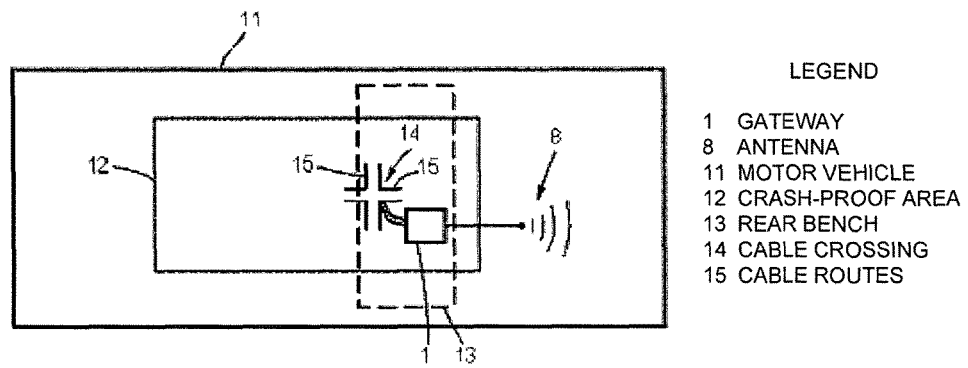
FIG. 2 is a block diagram of a motor vehicle.

FIG. 2 shows a schematic diagram of a motor vehicle 11 which has a crash-proof area 12 in the area of the internal space in which the passengers stay. In this crash-proof area 12, the gateway 1 is installed below a rear bench 13 of the motor vehicle 11. In this arrangement, it is arranged close to a cable crossing 14 of cable routes 15, containing two cables of the bus systems 4, as cable routing devices so that the gateway 1 can be connected over a short distance to all bus systems 4 which are not shown in greater detail here in their complete cabling. For the sake of clarity, the other vehicle systems which are connected by the bus systems 4 are also not shown in greater detail.

An antenna 8 not installed in the gateway 1 may be provided in the area of a front window, particularly integrated into the latter or at the window root, and connected to the gateway 1.

Figure 3:
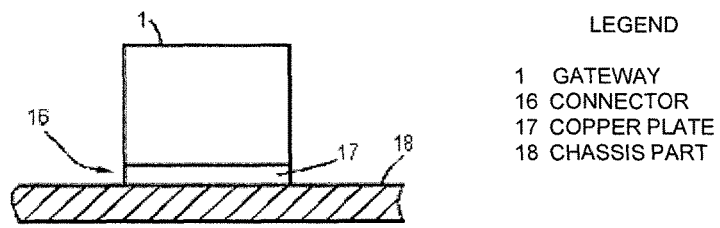
FIG. 3 is a block diagram illustrating the thermal linkage of a gateway to a chassis part.

FIG. 3 also shows that the gateway 1 is connected via a connector 16, which is designed here as copper plate 17, to an externally located chassis part 18 of the motor vehicle 1. In this way, the gateway 1 can be cooled, a good heat-conducting connection suitably also being established by using heat-conducting paste.

Naturally, corresponding heat-removing connections are also provided inside the gateway 1 but not shown in greater detail for the sake of clarity. In particular, the area of the housing adjoining the connector 16 is designed to be heat-conducting and connected inwardly, for example to heat exchangers which absorb the heat from corresponding parts of the computing device 5 and/or the communication device 6.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A motor vehicle capable of communicating with a network having at least one device external to the motor vehicle, the motor vehicle comprising:
 a chassis;
 a plurality of vehicle systems;
 bus systems configured to connect the plurality of vehicle systems to enable communication between the plurality of vehicle systems;
 a crash-proof area disposed in an area of an internal space of the motor vehicle configured to accommodate one or more passengers;
 a front seat and a rear bench disposed in the crash-proof area;
 a cable routing device carrying cables of at least one of the bus systems and disposed adjacent to the crash-proof area and below one of the front seat and the rear bench;
 a gateway, including:
  a housing;
  a connection device to connect to all the bus systems;
  at least one communication device, disposed in the housing, configured to perform wireless communication with the network; and
  a computing device, disposed in the housing, configured to control the exchange of data between the bus systems, to control the exchange of data between the bus systems and the network, and to communicate with the at least one communication device via a serial peripheral interface connection,
 wherein
  the at least one communication device is connected to the connection device in only an indirect manner, via the computing device, and
  the gateway is connected to the cable routing device and is disposed below the one of the front seat and the rear bench in the crash-proof area and adjacent to the cable routing device; and
 a heat-conducting connector adjoining the housing and the chassis, to connect the housing of the gateway to the chassis so as to cool the gateway during operation of the gateway.

2. The motor vehicle as claimed in claim 1, wherein the at least one communication device includes at least one of a transmitter, a receiver, and an antenna.

3. The motor vehicle as claimed in claim 1, wherein the at least one communication device includes at least one of a WLAN interface and an interface to a mobile radio network.

4. The motor vehicle as claimed in claim 1, wherein the at least one communication device and the computing device additionally communicate via a USB connection.

5. The motor vehicle as claimed in claim 4, wherein the computing device and the at least one communication device are configured to perform communication with one another by using TCP/IP protocol.

6. A motor vehicle capable of communicating with a network having at least one device external to the motor vehicle, the motor vehicle comprising:
 a plurality of vehicle systems;
 bus systems configured to connect the plurality of vehicle systems to enable communication between the plurality of vehicle systems;
 a crash-proof area disposed in an area of an internal space of the motor vehicle configured to accommodate one or more passengers;
 a front seat and a rear bench disposed in the crash-proof area;
 a cable routing device carrying cables of all of the bus systems and disposed adjacent to the crash-proof area and below one of the front seat and the rear bench; and
 a gateway, connected to the cable routing device and disposed below the one of the front seat and the rear bench in the crash-proof area and adjacent to the cable routing device, the gateway including:
  a housing;
  a connection device to connect to all the bus systems;

at least one communication device disposed in the housing and configured to perform wireless communication with the network; and a computing device disposed in the housing and configured to control the exchange of data between the bus systems, to control the exchange of data between the bus systems and the network, and to communicate with the at least one communication device via a serial peripheral interface connection, wherein the at least one communication device is connected to the connection device in only an indirect manner, via the computing device.

7. The motor vehicle as claimed in claim 6, further comprising a chassis part forming an outer boundary of the motor vehicle, and wherein the gateway is connected heat-conductively to the chassis part.

8. The motor vehicle as claimed in claim 6, further comprising:

a window; and an antenna connected to the at least one communication device of the gateway and disposed adjacent to or within the window.

9. The motor vehicle as claimed in claim 6, wherein the network includes a mobile radio network and a global network of computer networks, and wherein the at least one communication device includes a network access device and is configured to perform wireless communication in the mobile radio network and to connect to the global network of computer networks via the mobile radio network.

10. The motor vehicle as claimed in claim 6, wherein the bus systems include CAN buses, LIN buses, and FlexRay buses.

11. The motor vehicle as claimed in claim 6, wherein information received by the at least one communication device from the network is fed directly into at least one of the bus systems via only the computing device and connection device, without utilizing a bus system as an intermediate transmission medium.

12. The motor vehicle as claimed in claim 11, wherein information to be transmitted to the network by the at least one communication device is fed directly from at least one of the bus systems to the at least one communication device via only the computing device and connection device, without utilizing a bus system as an intermediate transmission medium.

* * * * *